United States Patent [19]

McIntosh

[11] Patent Number: 5,707,029
[45] Date of Patent: Jan. 13, 1998

[54] AILERON/ELEVATORS AND BODY FLAP FOR ROLL, PITCH, AND YAW CONTROL

[76] Inventor: William J. McIntosh, 103 Kennebecasis River Road, Hampton, New Brunswick, Canada, E0G 1Z0

[21] Appl. No.: 611,514

[22] Filed: Mar. 7, 1996

[51] Int. Cl.$^6$ ............................................. B64C 9/06
[52] U.S. Cl. ........................... 244/225; 244/88; 244/90 R
[58] Field of Search .................................. 244/221, 225, 244/87, 88, 90 R, 110 D, 113

[56] References Cited

U.S. PATENT DOCUMENTS

| | | | |
|---|---|---|---|
| 1,303,568 | 5/1919 | Voie | 244/88 |
| 1,397,292 | 11/1921 | Ortgier | 244/88 |
| 1,510,607 | 10/1924 | Polk | 244/88 X |
| 1,622,208 | 3/1927 | Roberts | 244/88 X |
| 1,721,598 | 7/1929 | Karrasch | 244/88 |
| 1,963,461 | 6/1934 | Blume | 244/87 |
| 1,974,040 | 9/1934 | Cormona | 244/88 |
| 2,386,915 | 10/1945 | Spittler | 244/88 |
| 2,405,907 | 8/1946 | Schmitt | 244/88 |
| 2,940,696 | 6/1960 | Teague, Jr. | 244/225 |
| 3,125,313 | 3/1964 | Soderberg | 244/87 |
| 3,442,472 | 5/1969 | Kalina | 244/87 |
| 4,424,946 | 1/1984 | Kramer | 244/90 R |
| 4,538,779 | 9/1985 | Goldstein | 244/225 X |
| 5,096,143 | 3/1992 | Nash | 244/87 |
| 5,224,665 | 7/1993 | Goldsberry et al. | |

FOREIGN PATENT DOCUMENTS

| | | | |
|---|---|---|---|
| 561332 | 10/1923 | France | 244/88 |
| 145770 | 7/1920 | United Kingdom | 244/88 |

*Primary Examiner*—William Grant
*Attorney, Agent, or Firm*—Paul Sharpe; McFadden, Fincham

[57] ABSTRACT

The present invention discloses an aircraft control system having simultaneously controllable rear aileron/elevators and a retractable body flap for longitudinal stabilization. The aileron/elevators are airfoils comprising the complete horizontal tail plane. Control arms for the rear aileron/elevators are capable of pivotal movement about the longitudinal axis of the aircraft while the aileron/elevators are secured to the control arms by axles pivotal about the lateral axis of the airfoil, for directional control. With two degrees of rotational movement, the aileron/elevators are capable of maneuvering the aircraft in all three axes, providing a much simpler mechanism than the conventional control surfaces. Added safety is accomplished by removing lateral control from the wings. Weight savings and reduced drag also result from eliminating the vertical stabilizer and rudder and consolidating the controls for both ailerons and elevators of conventional aircraft.

11 Claims, 3 Drawing Sheets

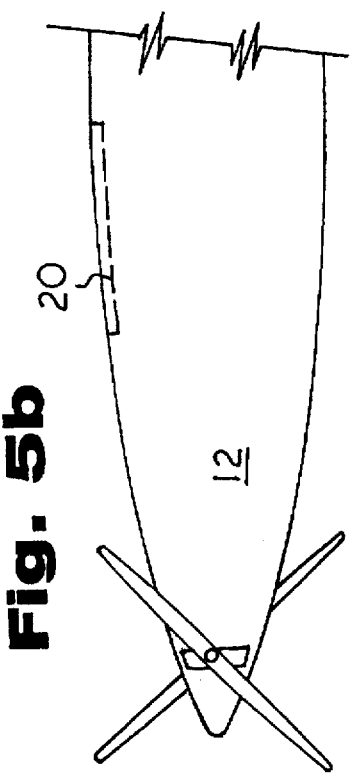
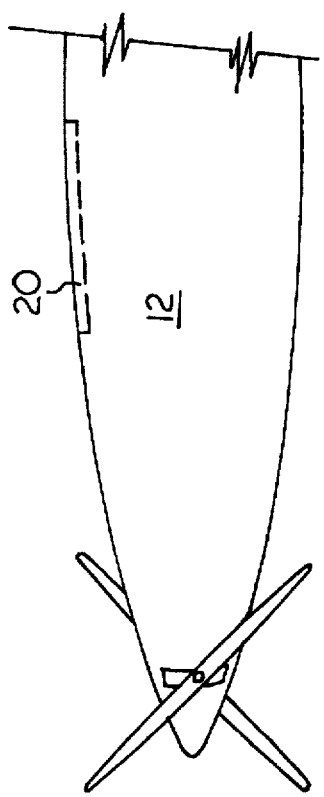
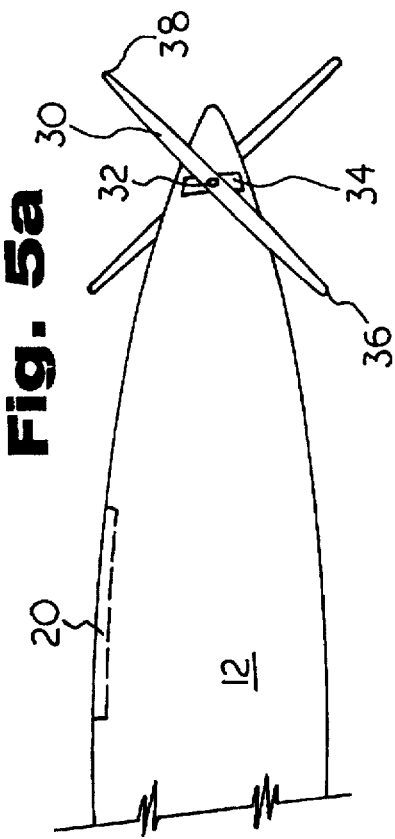
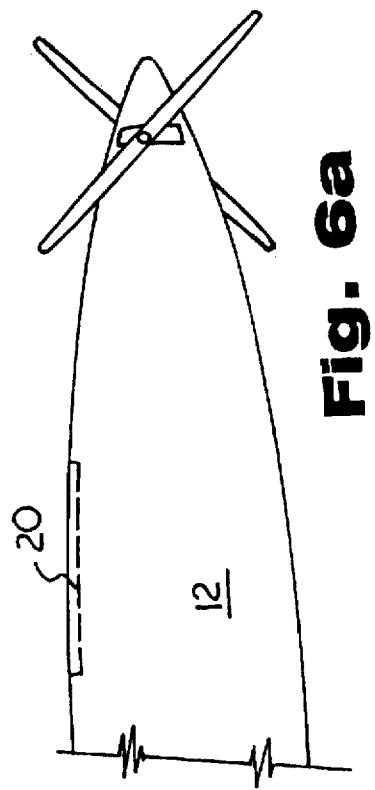

AILERON/ELEVATORS AND BODY FLAP FOR ROLL, PITCH, AND YAW CONTROL

FIELD OF THE INVENTION

The present invention relates to an aircraft control system, particularly having independently controllable rear aileron/elevators and a retractable longitudinal stabilizer means. The rear aileron/elevators mounted on separate control arms are capable of rotation in two axes which in cooperation with the longitudinal stabilizer means provide complete control of movement of the aircraft. The control system of the present invention provides a single control mechanism, eliminating the need for wing mounted ailerons or the vertical stabilizer and rudder of conventional aircraft.

BACKGROUND OF THE INVENTION

On a conventional aircraft control is achieved by employing a system of three separate control surfaces. These control surfaces are provided for directing and controlling the flight path including wing mounted independently deflectable ailerons, horizontal stabilizers and rear elevators, and the vertical stabilizer and rudder at the rear of the aircraft. Together as a system these control surfaces permit adjustment in three axes to the yaw, pitch, and roll movement of the aircraft in flight. Yaw is rotational movement about the vertical axis controlled by the rudder. Pitch is rotational movement about the transverse axis controlled by the elevators, and roll is movement about the longitudinal axis controlled by the ailerons. Movement about any of these axes is not independent, and consequently operation of the control surfaces must be coordinated to work together. For the three control surfaces of the conventional aircraft the system for affecting movement of the aircraft is the same. Each surface is an airfoil. Adjustment to a control surface changes the angle of attack and the camber of the airfoil changing the force upon it. During flight many forces act on the aircraft simultaneously. Consequently a single change to a control surface will cause as many effects to the forces on the aircraft.

Wing mounted ailerons, which have long been the standard, present serious risks during slow low flight. Ailerons change the camber of the wings, thus increasing their coefficient of lift but also decreasing the maximum angle of attack before stall. During level flight, use is made of their ability to increase the lift of a wing to provide lateral control to correct roll of the aircraft or to initiate turns. However, at speeds approaching the stall speed, the location of the ailerons on the wings can create serious stall problems. The situation can arise during take off or landing, when the aircraft has a high angle of attack and relatively low speed, that a low wing must be raised due to gusty or variable wind conditions. To do so, the aileron on the low wing must be lowered, but the lowered aileron will decrease the maximum angle at which the wing begins to stall, and also increase drag slowing the speed of the low wing. If the aircraft already has a high angle of attack, lowering the aileron may attempt to raise the angle of attack near or beyond the stall, and it may be difficult or impossible to raise the low wing. During take off and landing at low speeds, this problem can be very serious. In an extreme situation, the wing may stall producing an incipient spin. If the control surfaces for lateral control were not on the wings, this problem could be avoided.

Wind shear situations also present serious control problems in which conventional ailerons provide no assistance. A wind shear may suddenly change the effective speed of a slow moving aircraft, during landing for instance, to below its stall speed. When the wings are stalled, wing mounted ailerons cannot increase lift, and consequently offer no control. In fact, on a stalled wing, an aileron may suffer reversability and actually lower the wing intended to be raised. By removing ailerons from the wings and providing roll control on the tail plane, control can be gained even in severe conditions.

In addition it has long been recognized that the vertical stabilizer and rudder produce significant drag and add significant extra weight, and consequently are responsible for excessive fuel consumption. In commercial operation, fuel cost is the major operating expense. The vertical stabilizer comprises approximately 5% of the frontal area of an aircraft, but is in use for directional control only a small fraction of flight time. Unlike landing gear and flaps which are also in use a small percentage of flight time, the vertical stabilizer cannot be removed from the airflow when it is no longer required.

U.S. Pat. No. 2,386,915 issued in 1945 to Spittler discloses an aircraft from which the vertical stabilizer and rudder have been removed. In their place a horizontal plane mounted on a rotatable rear section of the fuselage is proposed. To execute a turn with this control system the entire rear section is rotated to exert a turning moment on the rear of the aircraft. However, while the rear section is rotated the aircraft would lose some longitudinal stability resulting in a nose down moment during rudder use. Without some means to counteract this pitching moment such an aircraft would be highly unmanageable to fly because rudder control would have to be exchanged for pitch control. In addition, wing mounted ailerons are still necessary for lateral control of this design.

U.S. Pat. No. 3,125,313 issued in 1964 to Soderberg discloses a control system designed to reduce drag, by eliminating all conventional control surfaces in favor of body flap controls. As disclosed these flaps would control all three axes of motion. The body flap has the advantage that it can be retracted flush with the body when not in use. The Soderberg design is primarily contemplated for reentry vehicles, although the disclosure suggests that the system might also work for submarines or conventional aircraft. The conical body with body flaps retracted is not a stable shape for flight. Consequently if this control system were used for conventional aircraft, at least two of the flaps would have to be out constantly for pitch control, and the advantage of fuselage flush controls would be lost almost completely. The effectiveness of each body flap would be dependant on the leverage distance it could extend from the rotational axis. This leverage distance would be limited, as disclosed, by the length of the control arms and the percentage of the periphery of the body represented by each body flap. For a conventional aircraft, the advantages of retractable flaps would be limited at the cost of unnecessarily complex control mechanisms. The complexity of the control system would make the conversion for a pilot of conventional aircraft difficult.

SUMMARY OF THE INVENTION

There is still a need to provide an aircraft control system which is both safer and offers improved control. There is always a need to further reduce drag and improve flight efficiency. It is, therefore, an object of the present invention to provide an aircraft control system having a single mechanism to provide pitch, roll and yaw control. It is an object of the present invention to provide a control system which reduces the risk of wing stall. It is a further object of the present invention to provide an aircraft control system which is more fuel efficient. It is a further object of the present invention to provide an aircraft control system which can continue to control an aircraft in "engine out" conditions where engine capability has become unbalanced.

Accordingly, the present invention provides an aircraft control system comprising:

a longitudinal stabilizer means comprising a body flap hingedly mounted at a leading edge to an upper surface of the aircraft proximate the rear aileron/elevators, and having a control arm adapted to raise a trailing edge of the body flap from a first position flush with a surface of the aircraft to a second position at an acute angle above the surface of the aircraft; and a pair of rear aileron/elevators, simultaneously operable from a neutral angle of attack to a positive or negative angle of attack both in the same or in opposite directions, and including a control arm associated with each aileron/elevator for providing simultaneous pivotal movement of the aileron/elevators about the longitudinal axis of the aircraft.

The present invention preferably includes a longitudinal stabilizer means comprising a body flap hingedly mounted at a leading edge to an upper surface of the aircraft proximate the rear aileron/elevators, and having a control arm adapted to raise a trailing edge of the body flap from a first position flush with a surface of the aircraft to a second position at an acute angle above the surface of the aircraft.

Preferably the present invention provides an aircraft control system comprising:

a tail plane including:

a pair of aileron/elevator airfoils having two degrees of movement, an axle on each aileron/elevator for providing simultaneous pivotal movement both in the same or in opposite directions about a lateral axis slightly forward of the center of pressure of each aileron/elevator, a pair of control arms on which the axles are mounted, for providing synchronized pivotal movement of the aileron/elevators about a longitudinal axis of the aircraft, and a longitudinal stabilizer means including:

a body flap having a leading edge hingedly mounted to an upper surface of the aircraft proximate the tail plane and a trailing edge, and an extendable control arm for moving the body flap from a first stowed position flush with the outside surface of the aircraft to a second operable position raising the trailing edge of the body flap to an acute angle above the surface of the aircraft, with the rotation of the aileron/elevators about the longitudinal axis of the aircraft.

Having described the invention generally, reference will now be made to the accompanying drawings illustrating preferred embodiments. Like numerals have been used throughout to designate like elements.

BRIEF DESCRIPTION OF THE FIGURES

FIG. 5a is a side view of the rear aileron/elevators in the full left aileron position;

FIG. 5b is an opposite side view of the configuration of aileron/elevators illustrated in FIG. 5a;

FIG. 6a is a side view of the rear aileron/elevators in the full right aileron position;

FIG. 6b is an opposite side view of the configuration illustrated in FIG. 6a.

For clarity all of the figures illustrate a portion of an aircraft fuselage and tail section only. The wings and further conventional details of the aircraft have been omitted. Terminology describing conventional control settings, such as down elevator, right aileron, or left rudder, has been used to describe the equivalent settings of the present invention as would be understood by a pilot of conventional aircraft.

DETAILED DESCRIPTION OF THE PREFERRED EMBODIMENTS

Figure 1:
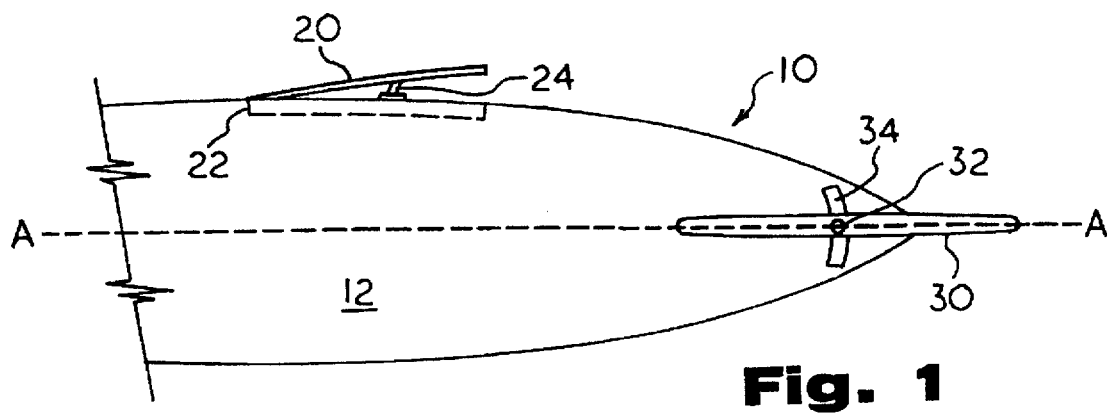
FIG. 1 is a side view of the rear aileron/elevator control system and the stabilizer flap.
Figure 2:
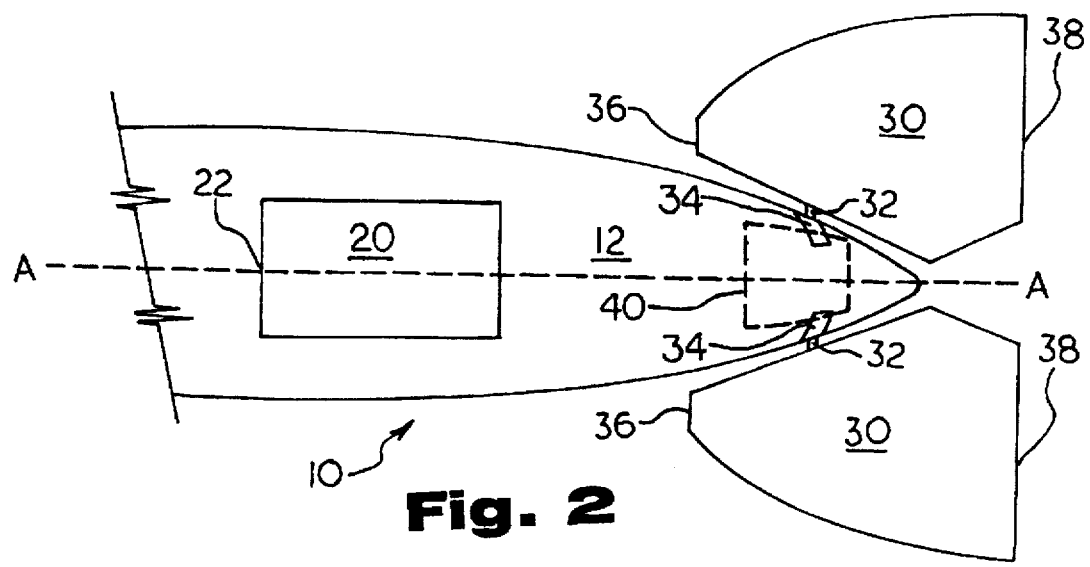
FIG. 2 is a plan view of the embodiment illustrated in FIG. 1.

As shown in FIGS. 1 and 2, the control system of the invention, in this embodiment generally indicated as 10, is consolidated in the rear section of the aircraft. On the top surface of the fuselage 12 is a body flap 20, and at the rear are located a pair of rear aileron/elevators 30.

The body flap 20 is generally rectangular and has a curved outer profile that is flush with the skin of the fuselage 12 in the stowed position. A hinge 22 pivotally connects the leading edge 23 of the flap 20 to the fuselage 12. The trailing edge 25 of the body flap 20 can be raised by a hydraulic control arm 24 until the flap 20 extends at the necessary angle from the top surface of the fuselage 12.

The rear aileron/elevators 30 are airfoils comprising the complete area of the horizontal tail plane. Their effective surface area is approximately 7–8 times that of conventional ailerons, thus contributing to improved control. In addition, their position at the rear of the aircraft offers improved control in situations where wing stall renders conventional ailerons ineffective. Each is mounted on a transverse axle 32 for independent rotational movement about a lateral axis of the aileron/elevator 30. Rotation of the aileron/elevator 30 on its transverse axle 32 changes the angle of attack from neutral to a positive or negative angle of attack. Preferably the axles 32 are positioned slightly forward of the center of pressure of the aileron/elevator airfoils, so that they are balanced at a neutral angle of attack. In addition, each axle 32 is located within a slot 34 for limited pivotal movement on a control arm 40 about the longitudinal axis, marked A—A in FIGS. 1 and 2, of the aircraft. The control arm 40 is associated with each aileron/elevator for providing simultaneous pivotal movement of the aileron/elevators about the longitudinal axis of the aircraft. The control arm, depicted by the box 40, is a conventional mechanical linkage, as available in the art. The leading edges 36 or trailing edges 38 of each rear aileron/elevator 30 can be raised and lowered independently for roll control and simultaneously for pitch control. A suitable control system, preferably hydraulic, operates the control arm 40 including the axle 32 for rotational and pivotal motion. Each control arm 40 has a pivotal range of 45° above and below a horizontal plane. In an embodiment of the invention the control arms 40 are adapted for pivotal motion about the longitudinal axis A—A of the aircraft of up to 35°–55° above and 35°–55° below a horizontal plane.

Figure 3:
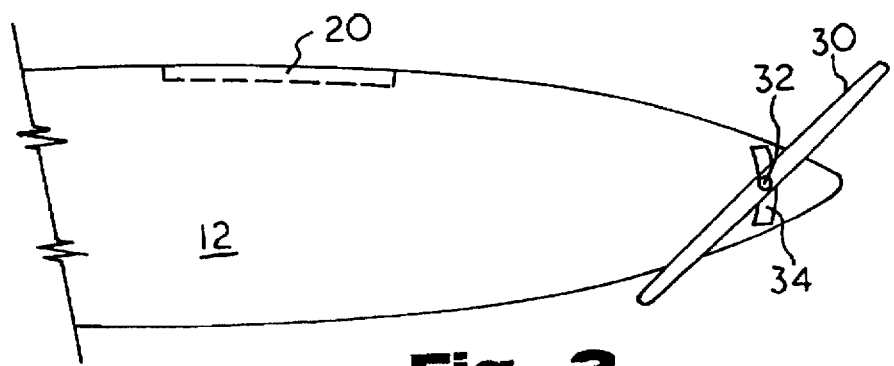
FIG. 3 is a side view of the rear aileron/elevators in the up elevator position.
Figure 4:
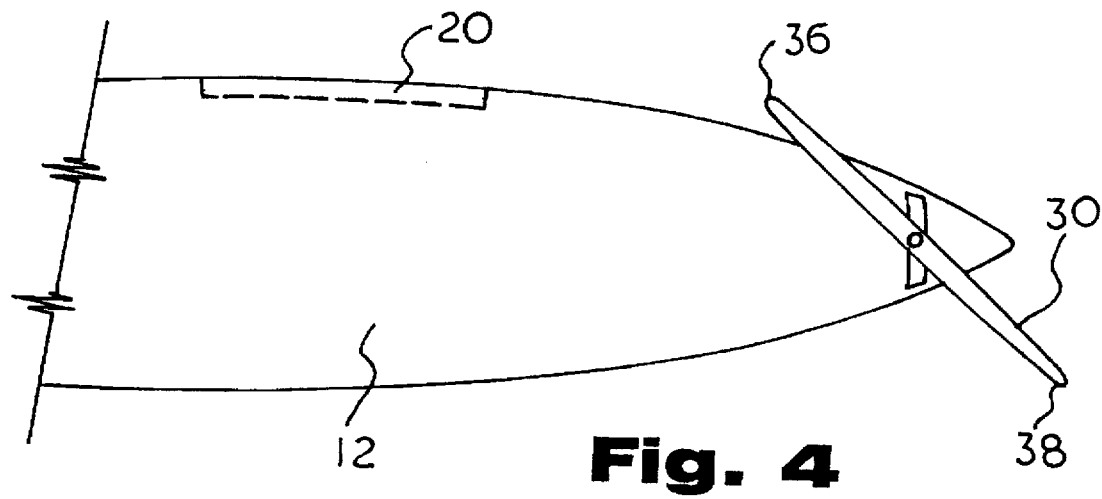
FIG. 4 is a side view of the rear aileron/elevators in the down elevator position.

In operation the control system according to the present invention provides cooperative control of an aircraft movement through three axes. For longitudinal control, as illustrated in FIGS. 3 and 4, pitch is affected by raising or lowering the leading edges 36 of both of the rear aileron/elevators 30 simultaneously. FIG. 3 illustrates the full up elevator position of the aileron/elevators 30, showing the leading edges 36 fully lowered to raise the nose of the aircraft. FIG. 4 illustrates the full down elevator position, showing the leading edges 36 fully raised to lower the nose of the aircraft. If the aileron/elevators 30 were not at a wings level position due to simultaneous roll correction, the deflection between right and left aileron/elevator 30 will be retained during elevator use, adding the angle of pitch to both rear aileron/elevators 30.

Lateral control, or roll control, is provided by independent use of the right and left rear aileron/elevators 30, as shown in FIGS. 5a and b and FIGS. 6a and b. The control arm 40 permits independent rotational control of the axle 32 for the right and left rear aileron/elevators 30. Lateral control correcting roll is affected conventionally by deflecting the leading edge 36 of one rear aileron/elevator 30 downward and raising the leading edge 36 of the opposite aileron/elevator 30. As shown in FIGS. 5a and b, a full left aileron would entail lowering the leading edge 36 of the left aileron/elevator 30 (FIG. 5a) and raising the leading edge 36 of the right aileron/elevator 30 (FIG. 5b), causing the left wing to rise. Full right aileron as shown in FIGS. 6a and b is opposite, lowering the leading edge 36 of the right aileron/elevator 30 (FIG. 6b) and raising the leading edge 36 of the left aileron/elevator 30 (FIG. 6a), causing the right wing to rise. When the wings are level, the angle of attack of both aileron/elevators 30 is the same.

The turning motion is initiated by lowering one wing in the direction of the desired turn by rolling the aircraft to a banked angle with the aileron/elevators 30, lowering the leading edge 36 of the aileron/elevator 30 corresponding to the low wing, and raising the leading edge 36 of the opposite aileron/elevator 30. The desired rate of turn will determine the angle of bank. Use of the aileron/elevators 30 will result in some loss of lift causing the nose of the aircraft to drop. To compensate, "elevator" is applied by lowering both leading edges 36 of the aileron/elevators 30 together until the aircraft flight is level on the longitudinal axis A—A. When the turn is complete, the wings are again levelled by returning the aileron/elevators 30 to their neutral setting.

Figure 7:
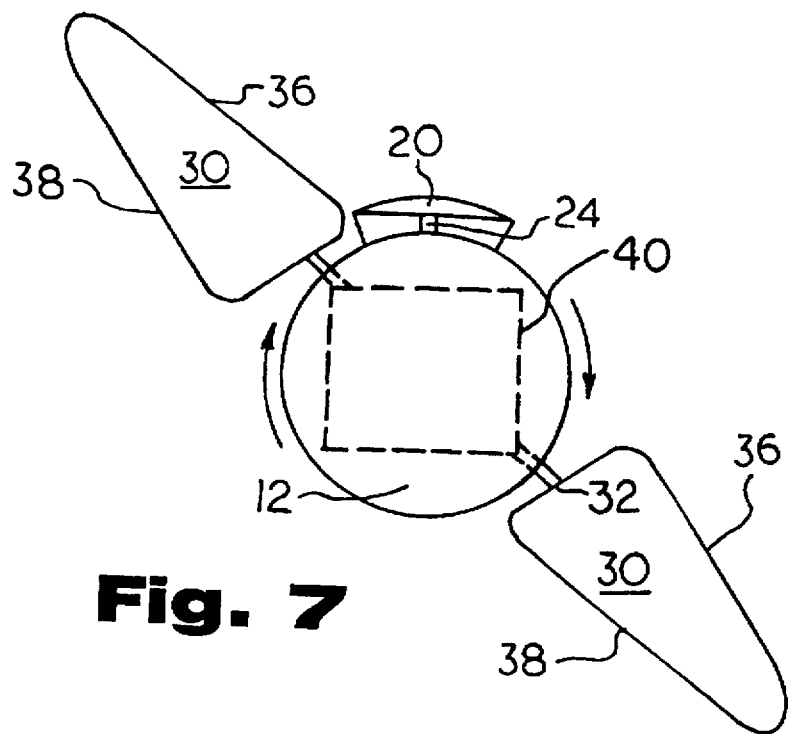
FIG. 7 is a rear view of the rear aileron/elevator control system and stabilizer flap in the full left rudder position.

For a stronger turning moment, primarily during take off or landing in cross wind conditions, to effect turns at slow airspeed, and in engine out conditions to maintain the fuselage parallel to the direction of travel, "rudder" must be applied. A rudder configuration for the control system of the present invention, as shown in FIG. 7, requires the control arms 40 to rotate the aileron/elevators 30 about the longitudinal axis A—A of the aircraft to the angle required, up to a maximum of about 45° above and below the horizontal. Both aileron/elevators 30 will rotate in the same direction, dependent on the direction of the turn or correction. Further rotation of the aileron/elevators 30 about their individual axles 32 will exert a strong turning moment on the aircraft, the leading edges 36 of both aileron/elevators 30 being rotated "upward", or toward the outside of the turn. This configuration, like the simple turn, will also cause a pitching moment on the nose of the aircraft. To compensate, the body flap 20 is raised above the fuselage 12. The trailing edge 25 of the body flap 20 is raised by a hydraulic control arm 24 to maintain a desired angle on the aircraft's lateral axis. The angle of the body flap 20 is adjustable depending upon the force of the moment exerted on the nose of the aircraft. The rudder configuration may be set or gradually increased as necessary to maintain control of the aircraft.

In FIG. 7 the "full left rudder" configuration is illustrated. The left aileron/elevator 30 is fully rotated 45° above the horizontal, and the right aileron/elevator 30 is fully rotated 45° below the horizontal. The leading edge 36 of each aileron/elevator 30 is fully raised (toward the right). The body flap 20 is also fully raised. In this configuration a strong turning moment is exerted on the aircraft to rotate about the aircraft's vertical axis to the left. Lift on the aileron/elevators 30 will draw the rear of the aircraft to the outside of the turn, avoiding unnecessary sideslip. The effect is sufficient to compensate for engine failure on the right side of the aircraft. When the "rudder" is engaged, control of all three axes is maintained through adjustment of the aileron/elevators 30. When the aircraft returns to level flight, the stabilizer flap 20 is again retracted flush with the surface of the fuselage 12, and the aileron/elevators 30 are returned to their neutral position.

The body flap 20 can also be used advantageously in conjunction with the "elevator" function to add additional leverage in raising the nose of the aircraft. The control arm 24 is programmed to respond synchronously when the pilot "pulls back on the stick" to raise the angle of attack. In aircraft maneuvers these motions are never isolated. Roll will cause some yaw and vice versa. Pitch may be adjusted concurrently with a turning motion. Consequently the control surfaces are programmed for coordinated operation. Advantageously control of the aileron/elevators 30 and body flap 20 may also be selectively operated by the pilot.

As control characteristics vary considerably depending on the aircraft, the actual design of the control system will also vary. Ailerons may remain on the wing from retrofit or as an added control mechanism. The rear aileron/elevators 30 may advantageously employ trim tabs to maintain their settings as conventional design has demonstrated effective.

Advantages of the control system according to the present invention are found in significant weight savings and elimination of drag from the vertical stabilizer. Weight savings and simplified construction are also realized in the elimination of wing ailerons and the consolidation of elevator and aileron hydraulic controls. In addition, removing ailerons from the wings improves safety and lateral control, and makes fowler flap installations much easier to engineer for required strength.

Although embodiments of the invention have been described above, it is not limited thereto, and it will be apparent to persons skilled in the art that numerous modifications and variations form part of the present invention insofar as they do not depart from the spirit of the claimed and described invention.

I claim:

1. An aircraft control system comprising:
   a pair of rear aileron/elevators simultaneously operable from a neutral angle of attack to a positive or negative angle of attack, both in the same or in opposite directions, and including a control arm associated with each aileron/elevator for providing simultaneous pivotal movement of the aileron/elevators about the longitudinal axis of the aircraft; and
   a longitudinal stabilizer means comprising a body flap hingedly mounted at a leading edge to an upper surface of the aircraft proximate the rear aileron/elevators, and having a control arm adapted to raise a trailing edge of the body flap from a first position flush with a surface of the aircraft to a second position at an acute angle above the surface of the aircraft.

2. An aircraft control system as defined in claim 1, wherein the aileron/elevators are airfoils comprising the horizontal tail plane of the aircraft.

3. An aircraft control system as defined in claim 2, wherein each aileron/elevator is pivotally mounted on an axle on the control arm to pivot about its lateral axis.

4. An aircraft control system as defined in claim 3, wherein each aileron/elevator is pivotally mounted slightly forward of its center of pressure.

5. An aircraft control system as defined in claim 4, wherein the control arms are adapted for pivotal motion about a longitudinal axis of the aircraft of up to 35°–55° above and 35°–55° below a horizontal plane.

6. An aircraft control system as defined in claim 5, wherein the control arms are adapted for pivotal motion about a longitudinal axis of the aircraft of up to 45° above and 45° below a horizontal plane.

7. An aircraft control system as defined in claim 5, wherein the control arms project through a slot in the outer surface of the aircraft.

8. An aircraft control system as defined in claim 1, wherein the longitudinal stabilizer means is selectively operable.

9. An aircraft control system as defined in claim 1, wherein the longitudinal stabilizer means is operable synchronously with rotation of the control arms about the longitudinal axis of the aircraft.

10. An aircraft control system as defined in claim 9, wherein the longitudinal stabilizer means is operable synchronously with simultaneous pivotal motion of both of the aileron/elevators about their lateral axes.

11. An aircraft control system comprising:

a tail plane including:
   a pair of aileron/elevator airfoils having two degrees of movement,
   an axle on each aileron/elevator for providing simultaneous pivotal movement both in the same or in opposite directions about a lateral axis slightly forward of the center of pressure of each aileron/elevator,
   a pair of control arms on which the axles are mounted, for providing synchronized pivotal movement of the aileron/elevators about a longitudinal axis of the aircraft, and a longitudinal stabilizer means including:
   a body flap having a leading edge hingedly mounted to an upper surface of the aircraft proximate the tail plane, a trailing edge; and an extendable control arm for moving the body flap from a first stowed position flush with the outside surface of the aircraft to a second operable position raising the trailing edge of the body flap to an acute angle above the surface of the aircraft, with the rotation of the aileron/elevators about the longitudinal axis of the aircraft.

\* \* \* \* \*